Figure 1:
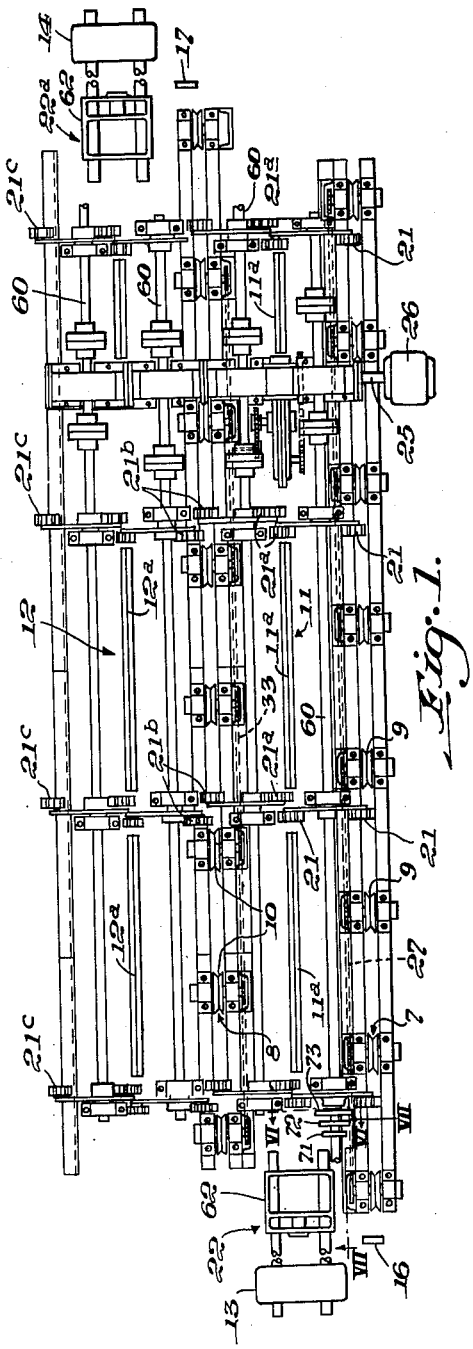

Oct. 6, 1953

G. T. CHURCH 2,654,463

FEED TABLE FOR THREADERS, REAMERS, AND
OTHER END-TOOLING OPERATIONS

Filed June 18, 1949

4 Sheets-Sheet 1

INVENTOR.
George T. Church
BY
Brown, Critchlow, Flick & Peckham
his ATTORNEYS.

Oct. 6, 1953

G. T. CHURCH 2,654,463

FEED TABLE FOR THREADERS, REAMERS, AND
OTHER END-TOOLING OPERATIONS

Filed June 18, 1949

4 Sheets—Sheet 2

INVENTOR.
George T. Church
BY
Brown, Critchlow, Flick & Peckham
his ATTORNEYS.

Patented Oct. 6, 1953

2,654,463

UNITED STATES PATENT OFFICE 2,654,463

FEED TABLE FOR THREADERS, REAMERS, AND OTHER END-TOOLING OPERATIONS

George T. Church, Butler, Pa., assignor to Fretz-Moon Tube Company, Inc., Butler, Pa., a corporation of Pennsylvania Application June 18, 1949, Serial No. 99,996

3 Claims. (Cl. 198—25)

1

This invention relates to apparatus for tooling pipe ends and, in particular, to automatic apparatus for conveying the pipe to and from reaming, threading or other pipe end finishing tools.

In the description to follow, the invention will be described with reference to pipe-end reaming, but, as will be appreciated, the apparatus is equally suitable for most any pipe-end tooling operation including thread forming or even sawing. Further, the invention is not intended to be limited to operations on tubular members since, if desired, the apparatus provided is capable of handling solid, elongate blanks.

In performing any operation on a pipe end, it is far preferable if only a specified portion of the end is tooled, since if excessive or insufficient amounts are worked, the resulting product is imperfect and may have to be rejected. However, in most mills, the equipment used in handling the pipe and feeding it to the reamer, or the like, is such that there is little uniformity in each tooling operation, and, as a result an unnecessary amount of pipe turns out as a defective product. In fact, the most common end-tooling practice requires the presence of a group of operators to manipulate the pipe and feed it to the tool, and the degree of perfection of the finished piece depends to a large extent on their skill and care, not only in aligning and feeding the pipe but also in judging the length of the period during which the tool is allowed to work on the pipe end. Consequently, the quality of the product may not be uniformly high and, in addition, manual operations such as these are uneconomical from the standpoint of labor cost as well as the fact that the rate of production is controlled by the operators.

To overcome the disadvantages of such manual finishing operations, automatic apparatus has been designed, this apparatus normally including a table onto which a pipe is delivered to be reamed. The reaming tool is disposed at one end of this table and following its operation, the pipe length is moved automatically to another table in which the opposite end is reamed. However, to avoid rejects, it is of prime importance to assure that the pipe is positioned on the tables in such a manner that only the desired extent of the ends of the pipes are presented to the finishing tool and, in most, if not all, prior automatic apparatus, the particular means used to carry the pipe to and place it on the table permit the pipe to move, or shift, longitudinally in one or the other direction after it theoretically has been positioned, such longitudinal shifting being due in

2 part to the fact that the pipe handling mechanism permits the pipe to drop a short distance onto the reaming table with the result that the pipe can bounce or joggle out of position. Also, the presently known automatic reamers, and the like, are unnecessarily expensive, complicated and slow.

It is therefore among the objects of the present invention to provide inexpensive and economically-operated apparatus for tooling the ends of pipe, or the like, the apparatus functioning to smoothly deposit separate lengths upon a reaming table in the precise position necessary for performing the finishing operation upon the desired portion only of its end.

A further related object is to provide automatic apparatus for tooling pipe ends which is capable of operating at a steady production rate, producing a uniformly good job, and substantially speeding up the tooling operations.

Another object is to provide apparatus for tooling the ends of pipe, or the like, in which the various pipe handling elements are driven synchronously and at readily variable speeds so that the time for performing each tooling operation can be varied to suit the need, the apparatus functioning when set for a particular tooling operation to allot a set period of time for the actual tooling so as to improve the resulting product.

According to the invention, the apparatus which, as a unit may be classed as a feed table, includes a conveyor on which a single length of pipe is moved a limited distance in an endwise direction, the limit of the movement being determined by a stop disposed to engage an end of the moving pipe and arrest the pipe in a predetermined position. Spaced laterally from the conveyor and positioned parallel to it is a pipe-receiving table and, aligned with the table, is a pipe-end machining tool, such as a reamer. In operation, a length of pipe is deposited on the conveyor, run up to its stop position and then transferred by suitable mechanism to the table where either the machining tool or the pipe are moved to bring the two into operative engagement. It will be appreciated that in such automatic operation the extent of the movement of the tool or the pipe on the table is constant, and, because of this, it is quite desirable to assure that the pipe rests on the table in a certain position, this position being determined with regard to the extent of the movement of the tool or the pipe subsequent to this positioning, as well as with regard to the portion of the pipe end to be operated upon.

To assure the placing of the pipe in precisely the desired position on the table, the conveyor stop is placed at such a position that the pipe is arrested with its stopped end in lateral alignment with the position at which this end is to be placed on the reaming table. Also, the transfer mechanism for moving the pipe to the table must perform in such a way that it picks up, carries and deposits the pipe smoothly without causing any longitudinal movement of the pipe. Preferably, such transfer mechanism includes a plurality of constantly rotating pipe transfer members, these members, preferably, being pivotally mounted on circumferentially-spaced, radially-extending arms. Also, each member is provided with a recess on its upper surface and is counterweighted so as to maintain the recess in an upwardly facing position. Consequently, each member, as it passes through the line of travel of the conveyor, smoothly lifts the pipe out of the conveyor and carries it upwardly and then downwardly through an arcuate path so as to deposit the pipe gently on the table. Preferably, the table is recessed in the same manner as the upper surface of the transfer members. As the pipe is delivered to the table, it immediately is engaged by suitable clamping mechanism, this mechanism also operating, after the tooling operation has been completed, to release the pipe and permit other mechanism to carry it away from the table.

Most suitably, the transfer members rotate in timed relation with the clamping and releasing movements of the clamping mechanism so that a length of pipe is placed upon the table between the clamps immediately after the previously operated upon pipe is clear of the table. In the preferred form of the invention, the apparatus is adapted for tooling both ends of a length of pipe, but the apparatus required for tooling the second end is substantially the same as that outlined above, and need not be described at this point.

Figure 2:
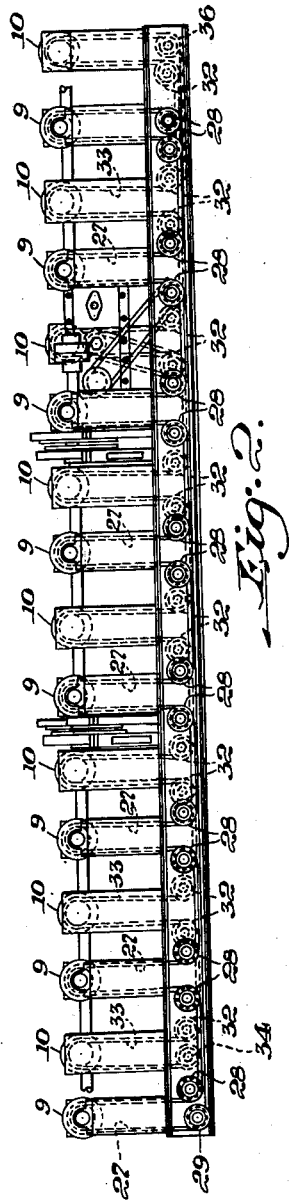
Figure 3:
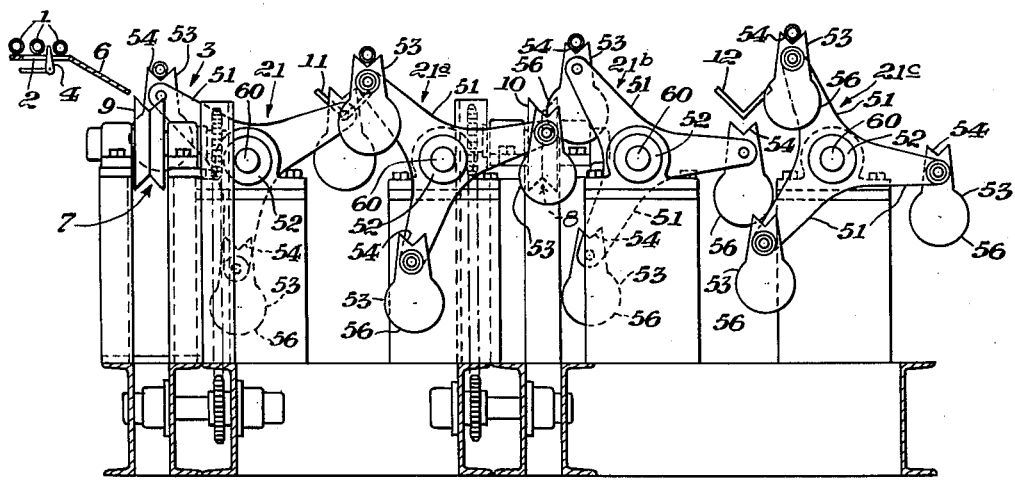
Figure 4:
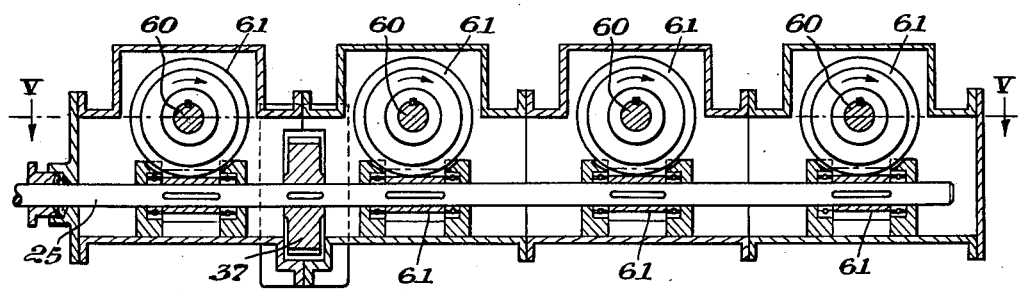
Figure 5:
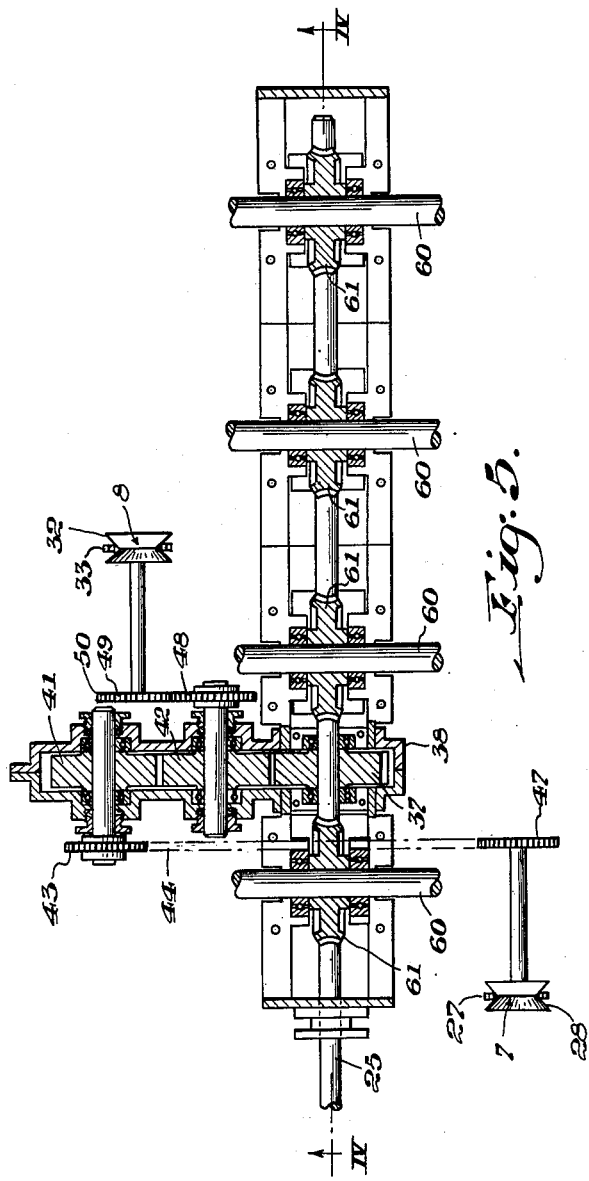

The preferred embodiment of the invention is illustrated in the accompanying drawings, in which Figs. 1, 2, and 3 are plan, side and end views, respectively; Fig. 4 an enlarged vertical section along the line IV—IV of Fig. 2, this view showing in some detail the conveyor and transfer mechanism drives; Fig. 5 a horizontal section taken along the line V—V of Fig. 4; and Figs. 6 and 7 enlarged views along lines VI—VI and VII—VII, respectively, of Fig. 1, these latter two views showing the pipe clamping mechanism for holding the pipe in its desired position upon the reaming table.

Referring to the drawings and in particular, to Fig. 3, it is presently contemplated that unfinished pipe I will be delivered from the mill to a rack on table 2 disposed adjacent to feed table 3, this table incorporating the improvements of this invention. Also individual lengths of pipe will be delivered one at a time to the feed table by means of reciprocating fingers 4 which urge the pipe onto an inclined chute 6. Such means of initially depositing the pipe on the feed table do not form any part of this invention, and, since their general construction is well known, they are only diagrammatically illustrated in Fig. 3.

Feed table 3 (Fig. 1) generally includes laterally spaced conveyors 7 and 8, made up of a series of spaced, constantly rotating, pipe-supporting rolls, 9, 10 and, a pair of pipe-supporting tables 11 and 12, table 11 being disposed between conveyors 7 and 8 and table 12 being spaced laterally beyond conveyor 8. Also, at one end of each table is carried a pipe finishing tool, such as reamers 13 and 14 which actually perform the finishing operation on the pipe ends, and at corresponding ends of each conveyor 7 and 8 are disposed, in a predetermined position to be described, stops 16 and 17.

As to the general operation of the feed table, a length of pipe received upon conveyor 7 is moved endwise up to stop 16, the constant rotation of rollers 9 holding the pipe end against this stop, and, immediately after the pipe is stopped, it is picked up by pipe transfer mechanism, generally indicated by numeral 21 (Fig. 3), and delivered onto reaming table 11. Upon delivery to table 11, the pipe is grasped by clamping mechanism, generally indicated by numeral 22, this clamping mechanism being mounted on a carriage which feeds the pipe end into reaming tool 13. After reaming of this one end of the pipe is completed, the clamping mechanism releases the pipe and additional transfer mechanism 21a quickly picks up and carries the pipe to conveyor 8, the movements of transfer mechanisms 21 and 21a being so timed with relation to the closing and opening of clamping mechanism 22 that another length of pipe is delivered and clamped on table 11 as soon as the preceding length is carried away by transfer mechanism 21a. Conveyor 8, upon receiving the pipe, moves it longitudinally up to its stop 17, and then transfer mechanism 21b carries the arrested pipe from this conveyor to table 12 on which the opposite end of the pipe is reamed in the same manner as that previously described. Subsequent to the reaming of this opposite end, another transfer mechanism 21c carries the finished pipe off of the feed table and onto a suitable conveyor or storage rack.

In addition to the general arrangement described above, other important features of the invention reside in the structure of the particular elements mentioned and in the manner in which they are synchronized to quickly and efficiently perform the desired tooling operations. Before considering these elements separately, it should be pointed out that the main drive for both of the conveyors as well as all of the transfer mechanism is supplied by a shaft 25 driven by a variable speed motor 26. Shaft 25 extends transversely across the upper portion of the feed table and the drives for the separate elements are taken from it by means of gearing arrangements to be described.

Conveyor 7, as has been pointed out, includes a series of pipe-supporting, rotating V-shaped or otherwise grooved rolls 9, these rolls being driven by an endless chain 27 (Fig. 2) which passes around them and which also is looped around a series of lower rolls 28, while at each end of the feed table there are mounted lower rolls 29 and 31 that are employed in the customary manner to complete the loop of the endless chain. Similarly, conveyor 8, includes a series of spaced upper and lower rolls 10 and 32 about which is looped an endless chain 33, and this conveyor also is provided with end rolls 34 and 36 to complete the loop of the chain.

As stated, the drive for both of these conveyors (Fig. 5) is taken from the main shaft 25, the driving connections including a gear 37 carried in gear box 38 and keyed to shaft 25. Gear 37 drives a pair of gears 41 and 42, gear 41 providing a drive for rollers 9 of conveyor 7 and gear 42 the drive for rollers 10 of conveyor 8. To operatively connect gear 41 with the rollers of conveyor 7, the gear shaft mounts an upper sheave 43 about which an endless chain 44 is looped, the chain also passing around a second sheave 47, this latter sheave being directly connected to and driving lower rollers 28 of conveyor 7, this drive being illustrated somewhat diagrammatically in Fig. 5. Similarly, gear 42 provides the drive for conveyor 8, its connections to the conveyor being through sheaves 48 and 49 about which is looped another endless chain 50, lower sheave 49 being directly connected to rollers 32 of conveyor 8. As will be noted, gears 41 and 42 rotate in opposite directions so that the rolls of conveyors 7 and 8 are driven in opposite longitudinal directions, this being desired since the conveyors must move pipe up to stop 16 on conveyor 7 and to stop 17 on conveyor 8.

Referring again to Figs. 1 and 3, after a length of pipe has been stopped on conveyor 7, for instance, transfer mechanism 21 picks it up and carries it to table 11. Table 11, as well as table 12, includes supported and longitudinally spaced V-shaped trough members 11a and 12a, the spacing of the troughs being for the purpose of permitting the transfer mechanisms 21, 21a, 21b, 21c to pass vertically between them. Also, in this regard, one reason for the upper and lower roll arrangements of conveyors 7 and 8 is to provide spaces between the upper rolls through which the transfer mechanisms are permitted to travel, these spaces being aligned with the spaces provided between trough members 11a and 11b.

Transfer mechanism 21 (Fig. 3), as well as the others, is formed of radially extending arms 51, mounted on a hub 52 keyed to a constantly rotating shaft 60, and, in addition, pipe holder members 53 each pivotally mounted near the outer portion of an arm. Further, pipe holders 53 are so positioned that, when rotated by arms 51, they pass through the open spaces provided between rollers 9 and 10 to pick up lengths of pipe and continue in their arcuate paths between the open spaces provided between troughs 11a and 12a to deposit the pipe on the reaming tables. Preferably, each holder 53 is provided with a V-shaped upper surface 54 which faces upwardly throughout the rotation due to the fact that their lower portions 56 are counterweighted as shown.

The drive for all of the pipe transfer mechanism (Figs. 3, 4 and 5) is from main shaft 25 through a plurality of worm gears 61, each of which is keyed to a drive shaft 60. Consequently, it will be noted that the drive for these members and for conveyor rolls 9 and 10 both extend from drive shaft 25 of motor 26, so that as the speed of motor 26 is increased or decreased, the rotation of the rolls of conveyors 7 and 8, as well as of arms of transfer mechanisms 21, 21a, 21b, 21c, all are increased or decreased proportionately. Gears 61, of course, are formed with regard to the desired synchronization of the transfer mechanisms with the rolls, as well as with the reaming tool operations, and, if desired, other gears may be substituted, it now being apparent that arms 51 must rotate sufficiently slowly to allow a length of pipe, deposited on either table 11 or 12, to be reamed and then carried away before the next length of pipe is delivered to that table.

As indicated above, one of the important improvements of this invention is to assure that the end of the pipe to be reamed, or otherwise operated upon, is positioned at a precise point on either of tables 11 or 12. This particular point on the tables is determined by the depth to which the end of the pipe being operated upon is to be worked by the tool, and also, by the distance which the pipe is moved to bring it into initial engagement with the tool or, alternatively, by the distance which the tool is to be moved to bring it into engagement with the pipe. As I have stated, if the pipe end is not placed at this precise point, the tooling operation will be imperfect. To obtain this precise position, stops 16 and 17 of conveyors 7 and 8 are disposed in the path of travel of the pipe at such a position that the pipe end to be tooled will be stopped on the conveyor at a point laterally aligned with the position which that end is to be set upon the table. Once the pipe is so positioned on the conveyor, the particular transfer mechanism is capable of picking up the pipe and smoothly carrying it through an arcuate path and depositing it gently without rebound or joggling on the table, such precise and smooth positioning, as well as the synchronous operations of the elements effecting it, substantially increasing the speed at which the feed table can be run.

As soon as a length of pipe is delivered to either table, it immediately is grasped by clamping mechanism 22, 22a, and, once grasped, there is no possibility of the longitudinal position of the pipe being accidentally changed. In the preferred form of the invention, it is desired to mount clamping mechanisms 22 and 22a on carriages 62, each of which is slidably supported on slide rods 63. The function of the carriage-mounted, clamping mechanism is to grasp the positioned pipe, move it into and then out of engagement with machining tools 13 and 14 and then open to release the finished pipe and receive another unfinished pipe. However, it will be understood that the tools, or reamers, could themselves be mounted for horizontal reciprocation into and out of engagement with the ends of the pipe.

Figure 6:
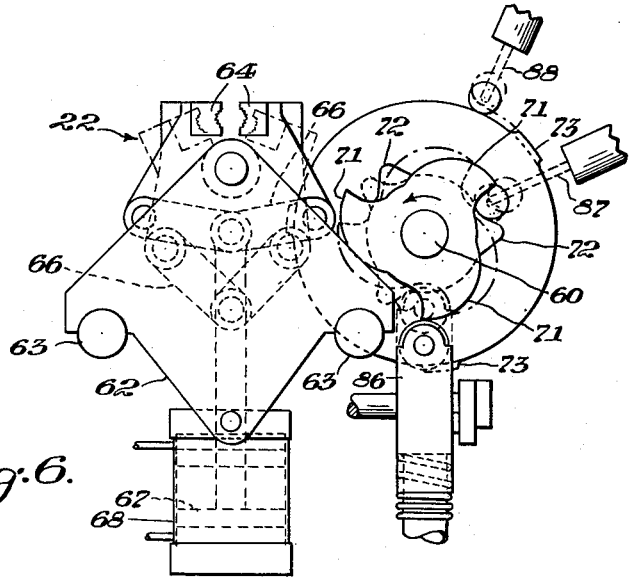
Figure 7:
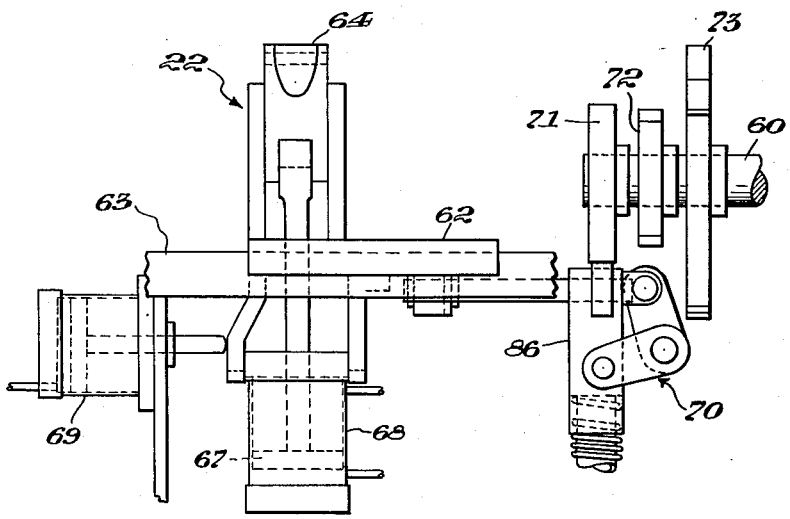

Clamping mechanism 22 is shown in Figs. 6 and 7, and since it is the same as mechanism 22a, its description will suffice for both. Further, because the particular manner in which the clamp and its carriage are actuated is incidental to this invention, Figs 6 and 7 are rather diagrammatic and the following description will consider mainly the mode of operation. As seen, the clamping member includes a pair of jaws 64 which are opened and closed by a toggle 66 operated by a piston 67 of an air cylinder 68. Further, the carriage is moved to the right (Fig. 7), i. e. away from tool-engaging position, by means of another air cylinder 69, while the opposite movement, i. e. toward tool-engaging position, is produced by a toggle linkage 70 to be described in further detail, these carriage movements, as well as the clamping actions being initiated by cams 71, 72 and 73, mounted on shaft 60, this particular shaft being the one that rotates transfer mechanism 21.

As seen in full lines in Figs. 6 and 7, the parts are in the position in which they would be at the particular instant that the reaming has just been completed, or, in other words, the moment at which carriage 62 is commencing its return from the reamer. Jaws 64, it will be noted, are closed in a pipe-gripping position. Persuing the operation from this point, as shaft 60 rotates, in a counter-clockwise direction, cam 71, for reasons which will become clear, allows an arm 86 to spring upwardly and, at the same moment, cam 72 depresses a plunger arm 87, this latter arm acting on a suitable air valve to admit air into cylinder 69 to force carriage 62 to the right. As the carriage progresses to the right, cam 73, in its orbit, presses against another plunger 88 which causes air pressure flow into toggle-operating cylinder 68 to open jaws 64 of the clamping mechanism, the timing being such that, when the carriage is fully returned from its tool-engaging position the jaws are open. At this point, a pipe is quickly picked out from between the jaws by one of the pipe holders 53 of transfer mechanism 21a, while another pipe holder of transfer mechanism 21 deposits another length of pipe between the jaws, it being noted that all of these actions are dependent upon the speed of rotation of shaft 60 so that very close timing is possible. Following this exchange of pipe lengths, cam 73 passes over plunger arm 88 so as to reverse the flow of air into cylinder 68 and to close jaws 64. Further, at this particular time, cam 71 is commencing to press arm 86 downwardly, and, as should be clear in Fig. 7, the downward movement of this arm exerts a pressure, through linkage 70, against carriage 62 to move the carriage to the left towards tool-engaging position. Movement to the left is continued until the operation on the pipe is completed, following which the return cycle as described above commences. The particular importance of such clamping mechanism is that, as can be appreciated, it is synchronized with the main drive of the feed table, so that, as the speed of feed table motor 26 is increased, the movements of the clamping jaws and its carriage also are increased proportionately so as to remain in step.

The above description has been concerned principally with the mechanism for reaming the left-hand end of a length of pipe, such mechanism including pipe transfer mechanisms 21 and 21a, conveyor 7, and the tool feeding action of clamping mechanism 22. However, as may be gathered, the mechanism for reaming the right-hand end of the pipe is identical with that discussed above and, as should be clear, operates in timed sequence due to its common drive from shaft 25. Consequently, it is felt that such other mechanism and the drives therefor do not require a detailed, repetitious description. Such other mechanism includes transfers 21b, 21c, conveyor 8 and clamping mechanism 22a.

There are a number of features which render the use of this feed table advantageous, one of these being the speed and efficiency at which the table may be operated, this speed being permitted by the use of the particular elements and by the fact that they are so arranged and driven that their movements can be very closely timed to the point of having the elements just barely clear one another as they move. Further, the job performed is exceptionally good since the pipe handling mechanism, the conveyors, the pipe transfer mechanism and the clamping mechanism operate to properly position the pipe for tooling, and the period of the actual tooling, or metal working, can be accurately set to produce a uniform result. Along with these improvements, the particular feed table arrangement is structurally simple, inexpensively manufactured and economically operated.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Work handling mechanism for positioning an elongate metal blank with one of its ends disposed in a desired vertical plane, said mechanism comprising a stationary blank-supporting table, an elongate conveyor extending parallel to and spaced laterally from said table, means continuously driving said conveyor for moving said blank in an endwise direction on it, a stop disposed near one end of the conveyor in position for halting said moving blank at a desired position on the conveyor, said blank being maintained in position in contact with said stop by said continuous drive of the conveyor, said conveyor and table both being divided into a plurality of blank-supporting members relatively disposed laterally in such positions as to provide laterally aligned open spaces, and a plurality of transfer members rotatably traveling each in a vertical plane through said aligned spaces for picking up a blank positioned on said conveyor and carrying and depositing said blank on said stationary table with the end of the blank lying in the same vertical plane as said blank-contacting surface of said conveyor stop, said transfer members each including a rotatably driven radially extending arm pivotally mounting near its outer end a counterweighted blank carrying member having its upper surface formed to receive said blank.

2. Work handling mechanism for positioning an elongate metal blank with one of its ends disposed in a desired vertical plane, said mechanism comprising a stationary blank-supporting table, an elongate conveyor extending parallel to and spaced laterally from said table, means continuously driving said conveyor for moving said blank in an endwise direction on it, a stop disposed near one end of the conveyor in position for halting said moving blank at a desired position on the conveyor, said blank being maintained in position in contact with said stop by said continuous drive of the conveyor, said conveyor and table both being divided into a plurality of blank-supporting members relatively disposed laterally in such positions as to provide laterally aligned open spaces, and a plurality of transfer members rotatably traveling each in a vertical plane through said aligned spaces for picking up a blank positioned on said conveyor and carrying and depositing said blank on said stationary table with the end of the blank lying in the same vertical plane as said blank-contacting surface of said conveyor stop, said transfer members each including a plurality of rotatably driven radially extending arms each pivotally mounting near its outer end a counterweighted blank carrying member having its upper surface formed to receive said blank.

3. Work handling mechanism for successively positioning both ends of an elongate metal blank in desired vertical planes, said mechanism comprising a pair of laterally spaced stationary blank-supporting tables adapted to receive said blank, a pair of elongate conveyors extending parallel to and spaced laterally from said tables, one of said tables being disposed between said pair of conveyors, means continuously driving said conveyors in opposite directions for moving said blank first in one endwise direction on one conveyor and then in the opposite direction on the other, a pair of stops disposed one near one end of said one conveyor and the other near the opposite end of said other conveyor, said stops being disposed in position to halt said blank carried on said conveyors at certain desired positions, the blank being maintained in contact with said stops by said continuous drive of the conveyors, said pairs of conveyors and tables all being divided into a plurality of blank-supporting members relatively disposed laterally in such positions as to provide laterally aligned open spaces, and a plurality of blank transfer members rotatably traveling each in a vertical plane through aligned spaces between each adjacent conveyor and table for (1) picking up a blank positioned on said one conveyor and depositing the blank on the table adjacent to said one conveyor with the end of said blank lying in the same vertical plane as the blank-contacting surface of the stop associated with said one conveyor, (2) picking up said blank on said last-mentioned table and depositing it on said other conveyor and (3) picking up the blank positioned on said other conveyor and depositing it on said other table with the opposite end of the blank lying in the same vertical plane as the blank-contacting surface of said stop associated with said other conveyor, said transfer members each including a plurality of rotatably driven radially extending arms each pivotally mounting near its outer end a counterweighted blank carrying member having its upper surface formed to receive said blank.

GEORGE T. CHURCH.

References Cited in the file of this patent

UNITED STATES PATENTS

| Number | Name | Date |
|---|---|---|
| 504,394 | Maddock | Sept. 5, 1893 |
| 825,421 | Saunders | July 10, 1906 |
| 931,543 | Worth et al. | Aug. 17, 1909 |
| 1,285,584 | Baines et al. | Nov. 26, 1918 |
| 1,659,848 | Wilson | Feb. 21, 1928 |
| 1,800,779 | Clark | Apr. 14, 1931 |
| 1,919,394 | Rosenkranz | July 25, 1933 |
| 2,063,689 | Littler | Dec. 8, 1936 |
| 2,176,188 | Poole et al. | Oct. 17, 1939 |
| 2,210,531 | Engelbaugh et al. | Aug. 6, 1940 |
| 2,405,141 | Hibbard | Aug. 6, 1946 |
| 2,426,095 | Hecker | Aug. 19, 1947 |
| 2,519,837 | Lampard | Aug. 22, 1950 |